(12) United States Patent
Basile et al.

(10) Patent No.: US 11,208,216 B2
(45) Date of Patent: Dec. 28, 2021

(54) PROCESS FOR ASSEMBLING PORTIONS OF AN AERONAUTICAL WING

(71) Applicant: SALVER S.P.A., Rome (IT)

(72) Inventors: Renato Basile, Rome (IT); Ivan Politano, Rome (IT); Aldo Amati, Rome (IT)

(73) Assignee: SALVER S.P.A., Rome (IT)

(*) Notice: Subject to any disclaimer, the term of this patent is extended or adjusted under 35 U.S.C. 154(b) by 0 days.

(21) Appl. No.: 16/758,214

(22) PCT Filed: Oct. 26, 2018

(86) PCT No.: PCT/EP2018/079399
§ 371 (c)(1),
(2) Date: Apr. 22, 2020

(87) PCT Pub. No.: WO2019/081703
PCT Pub. Date: May 2, 2019

(65) Prior Publication Data
US 2020/0324916 A1 Oct. 15, 2020

(30) Foreign Application Priority Data
Oct. 27, 2017 (IT) .................. 102017000122745

(51) Int. Cl.
B64F 5/10 (2017.01)
B64C 3/18 (2006.01)
B64C 3/20 (2006.01)
B64C 3/26 (2006.01)

(52) U.S. Cl.
CPC ............... *B64F 5/10* (2017.01); *B64C 3/182* (2013.01); *B64C 3/185* (2013.01); *B64C 3/20* (2013.01); *B64C 3/26* (2013.01)

(58) Field of Classification Search
None
See application file for complete search history.

(56) References Cited

U.S. PATENT DOCUMENTS

| | | | |
|---|---|---|---|
| 6,269,527 | B1 | 8/2001 | Nelson |
| 6,551,428 | B1 | 4/2003 | Guillou et al. |
| 6,638,466 | B1 | 10/2003 | Abbott |
| 9,352,822 | B2 | 5/2016 | Nordman |
| 2009/0282668 | A1 | 11/2009 | Sanchez-Brunete |
| 2015/0314889 | A1 | 11/2015 | Day et al. |

*Primary Examiner* — Alexander S Thomas
(74) *Attorney, Agent, or Firm* — Volpe Koenig

(57) ABSTRACT

A process for assembling portions of an aeronautical wing, in which a wing covering is assembled with carrier structural elements, allows the simultaneous application of all filling tapes on an exposed surface, by speeding-up and making more reliable the process itself. The process includes: placing side by side the structural elements longitudinally, to form the spars, by determining a flat surface, having a plurality of longitudinal junctions, faced upwards; adhering to the longitudinal junctions respective filling tapes; translating and rotating by 180° the structural elements in one single solution, by keeping them fixed in the mutual positions thereof and by transferring them above an inner surface of a wing covering; and translating the structural elements in one single solution, by keeping them fixed in the mutual positions thereof, downwards, by making the flat surface thereof to coincide with said inner surface.

11 Claims, 11 Drawing Sheets

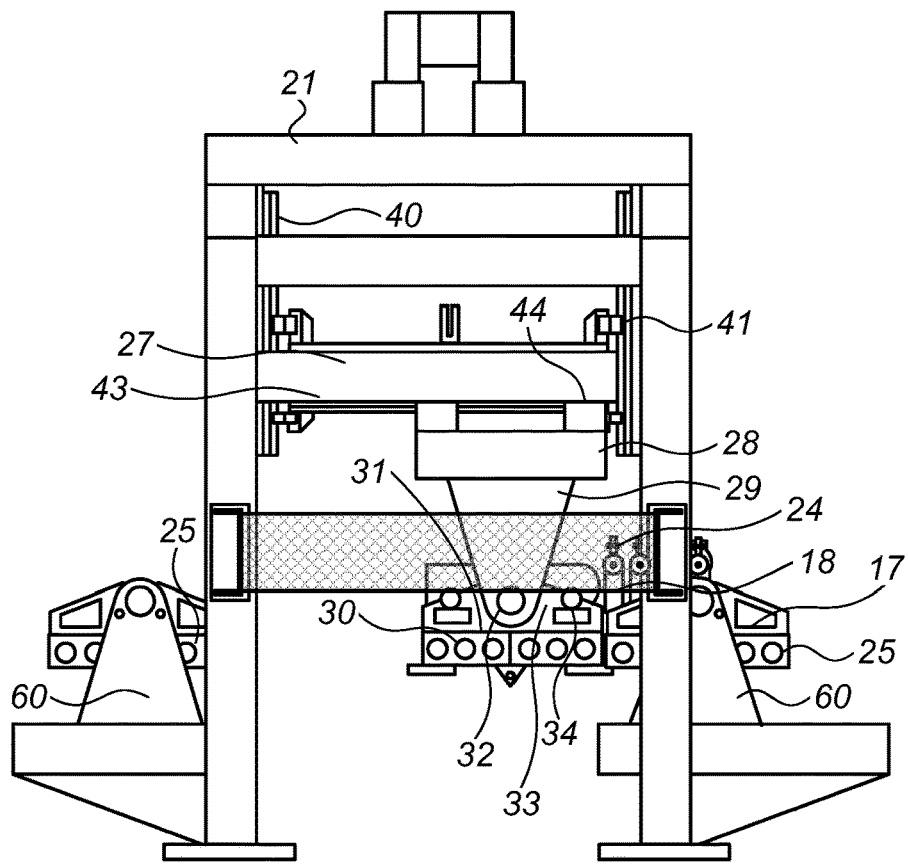
FIG. 6
FIG. 7
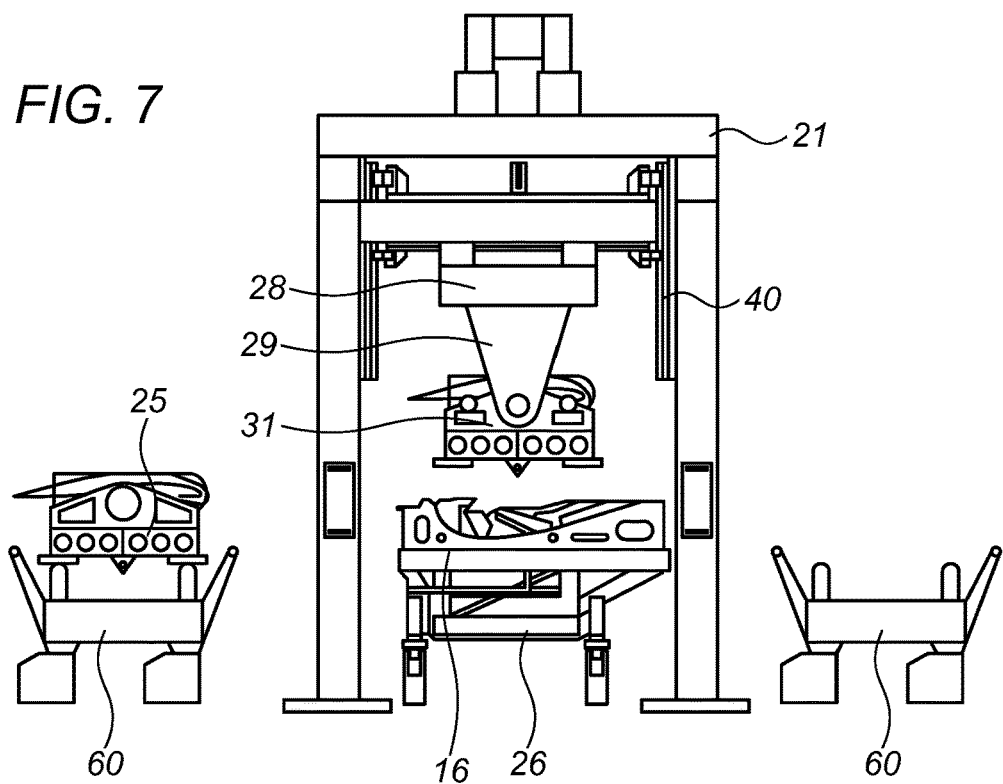

PROCESS FOR ASSEMBLING PORTIONS OF AN AERONAUTICAL WING

FIELD OF THE INVENTION

The present invention relates to a process for assembling portions of an aeronautical wing, wherein a covering, conventionally called skin, made of composite material is assembled with carrier structural elements, in particular spars, cross-members, stringers.

BACKGROUND

Under wing portion any element is meant constituting a wing surface of an aircraft, including the drift fins, both of mobile type and of fixed type, with particular reference to the mobile portions, such as the ailerons or high-lift flaps, which are actuated to modify the shape and the extension of a wing surface, and then the lift thereof, providing to the aircraft the so-called control surfaces which are activated by the cockpit by means of hydro-mechanical, or electro-mechanical systems, by means of a suitable control, and they are controlled electronically in the various flight steps.

The assembly between laminar covering and structural components can be implemented by means of a riveting procedure, which however results to be a slow process, which restrains a considerable level of accuracy and which however cannot implement a wholly smooth surface.

More advanced procedures provide the contemporary construction, though dedicated equipment, of the outer skin, of the inner structural elements and of the leading edge. This is implemented by means of a combined system of stiff metal tools and flexible tools so as to guarantee the required compaction of the laminated products made of carbon fibre fiber and to allow the treatment in autoclave.

However, the perfect adhesion between the laminar coverings and the structural elements requests that the coinciding surfaces are perfectly smooth. Since the structural elements, in particular the spars, are constituted by elements which extend longitudinally to the wing portion and which are placed side by side therebetween, there are junctions determined by the rounded edges of the single portions. These junctions are made smooth with the addition of filling tapes, made of composite material too. The whole is intended to the treatment (hardening) in autoclave.

The positioning of the tapes is made complicated in that they are interposed between the inner surface of the covering and the side-by-side placed structural elements, and this forces to an uncomfortable and not reliable processing.

Therefore, their positioning is particularly difficult, since they have to be placed one at a time, between the positioning of a structural element and the subsequent one, by making the assembly process slow.

Furthermore, possible wrong positions, are difficult to be detected during the process, the tapes being hidden, so that the wing portions risk of being discarded at the end of the production process only, upon a final suitability examination.

U.S. Pat. No. 6,638,466 A describes a process for assembling aeronautical control surfaces, wherein the control surface is defined by a lower skin and by an upper skin, intended to form the leading edge of the control surface by means of the connection to a front spar.

U.S. Pat. No. 9,352,822 B2 describes the use of filling tapes in assembling composite wing portions, intended to a hardening step in autoclave.

The technical problem underlying the present invention is to provide an assembly process allowing to obviate the drawback mentioned with reference to the prior art.

SUMMARY

Such problem is solved by a process as above specified which comprises the steps of:
- placing side by side the structural elements longitudinally, to form the spars, by determining a flat surface, having a plurality of longitudinal junctions, faced upwards;
- adhering to said longitudinal junctions respective filling tapes;
- translating and rotating by 180° said structural elements in one single unit, by keeping them fixed in the mutual positions thereof and by transferring them above an inner surface of a wing covering, in particular an upper covering; and
- translating said structural elements in one single unit, by keeping them fixed in the mutual positions thereof, downwards, by making their flat surface to coincide with said inner surface.

The main advantage of the assembling process according to the present invention is to allow the simultaneous application of all filling tapes on an exposed surface, by speeding-up and making the process itself more reliable.

The present invention further relates to an apparatus for assembling wing portions for implementing the process defined above, comprising:
- at least an assembly plane, intended to receive the wing structural elements placed side by side longitudinally therebetween, so as to determine a flat surface faced upwards, having means for translating said at least assembly plane according to a direction perpendicular to the longitudinal extension of the structural elements;
- a handling plane, intended to receive said structural elements placed side by side, comprising:
  means for translating said handling plane according to a direction perpendicular to the longitudinal extension of the structural elements, so that the structural elements could be transferred simultaneously from an assembly plane to the handling plane;
  means for rotating said handling plane, apt to overturn said structural elements in one single unit;
  means for translating vertically upwards or downwards said handling plane;
- an assembly compartment, formed by a frame whereon said handling plane is assembled;
- a mobile plane, adapted to receive a wing covering and to be inserted in said assembly compartment when the assembly plane is raised upwards with respect thereto, comprising means for moving said mobile plane according to a direction parallel to the longitudinal development of the wing covering on the mobile plane.

BRIEF DESCRIPTION OF THE DRAWINGS

The present invention will be described hereinafter according to a preferred embodiment example thereof, provided by way of example and not for limitative purpose with reference to the enclosed drawings wherein:

FIGS. 6 to 11 show respective front views of the apparatus of FIG. 4 in different steps of the assembly process according to the present invention;

DETAILED DESCRIPTION OF THE PREFERRED EMBODIMENTS

Figure 1:
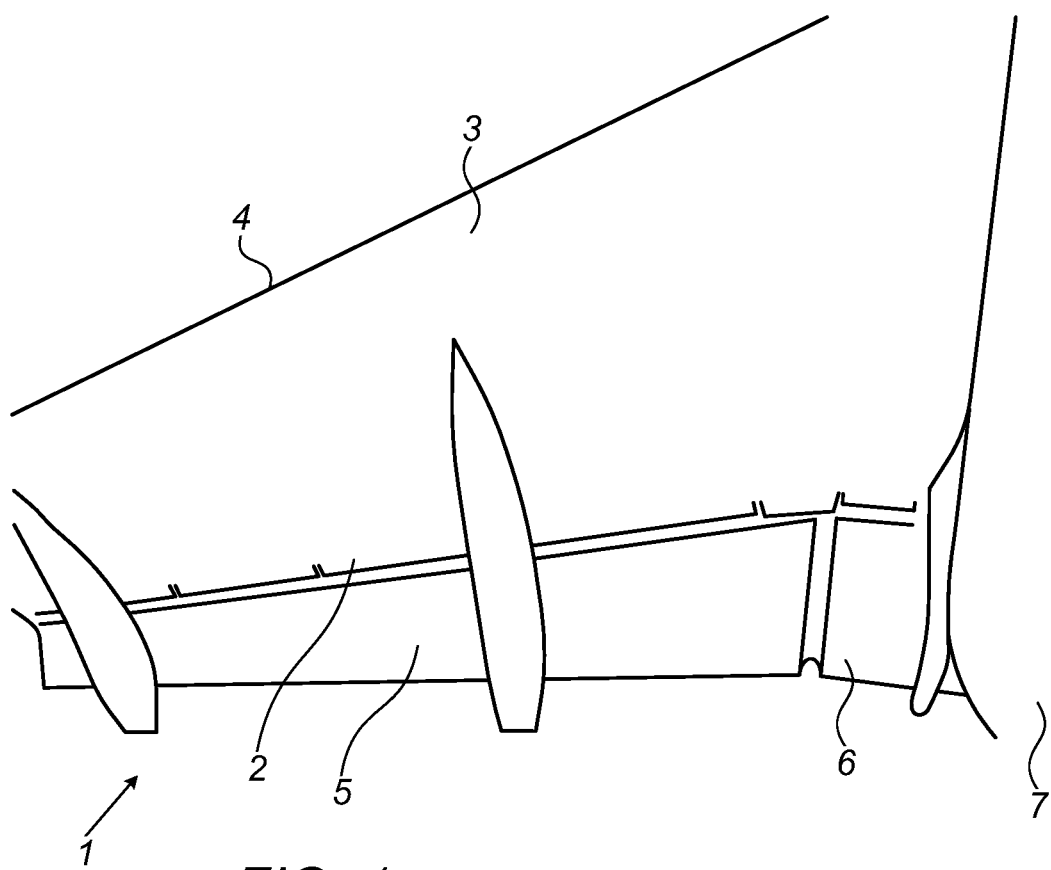
FIG. 1 shows a perspective view of a fixed wing with some control surfaces of an aircraft.

With reference to the figures, an aircraft wing is designated with 1; it comprises a leading edge 3 and a trailing edge 2. At the leading edge 3 the wing 1 comprises a plurality of ailerons 4, whereas at the trailing edge 2 the wing 1 comprises an outer high-lift flap 5 and an inner high-lift flap 6, adjacent to the aircraft fuselage 7.

Ailerons and high-lift flaps are examples of wing portions which can be produced with the process which will be described hereinafter, thereto however it is not strictly limited.

Figure 2:
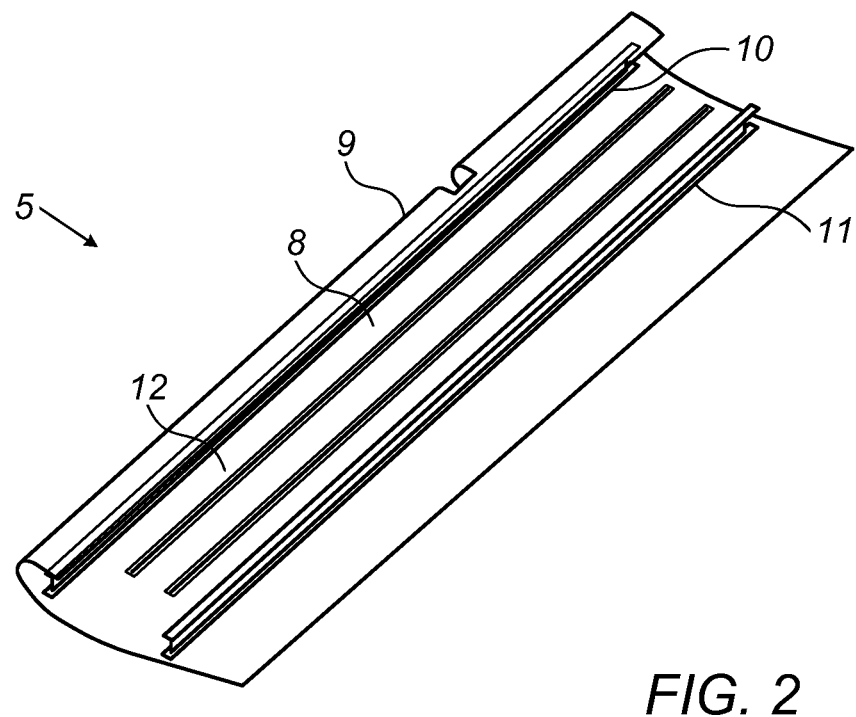
FIG. 2 shows a mobile wing portion, in particular an outer high-lift flap, in an intermediate assembly step which illustrates the structural portions thereof.

With reference to FIG. 2, an outer high-lift flap 5 is represented partially, in particular the upper covering thereof 8 having a front concavity 9 determined by the leading edge of the high-lift flap 5.

Inside the covering 8 a front spar 10, intended to be coupled to said front concavity 9, a rear spar 11 and a plurality of stringers 12 intermediate between the two spars 10, 11 are arranged.

The spars 10, 11 and the stringers 12 are longitudinal structural elements of the herein considered wing portion. They have to be placed side by side one another by forming a flat surface which has to be coupled with the inner surface 13 of the outer covering 8; they are joined transversally by herein not represented cross-members. It is meant that this wing portion will include even an inner covering which, during operation, is faced downwards whereas the outer covering 8 is faced upwards. The inner covering is not represented here to allow to view the inner structural elements 10, 11, 12.

Figure 3:
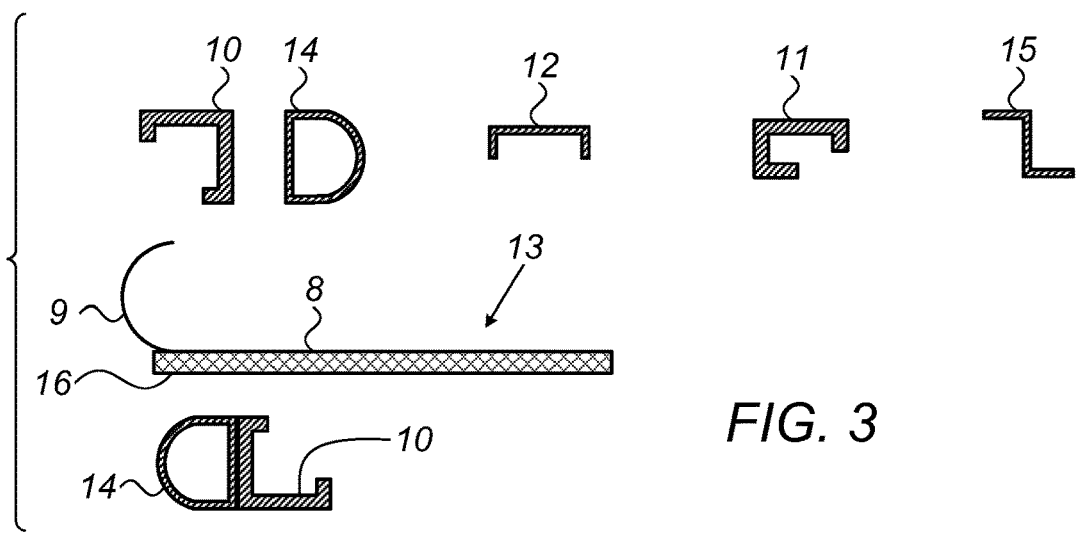
FIG. 3 shows schematically the structural elements used in the assembly process according to the invention.
Figure 3A:
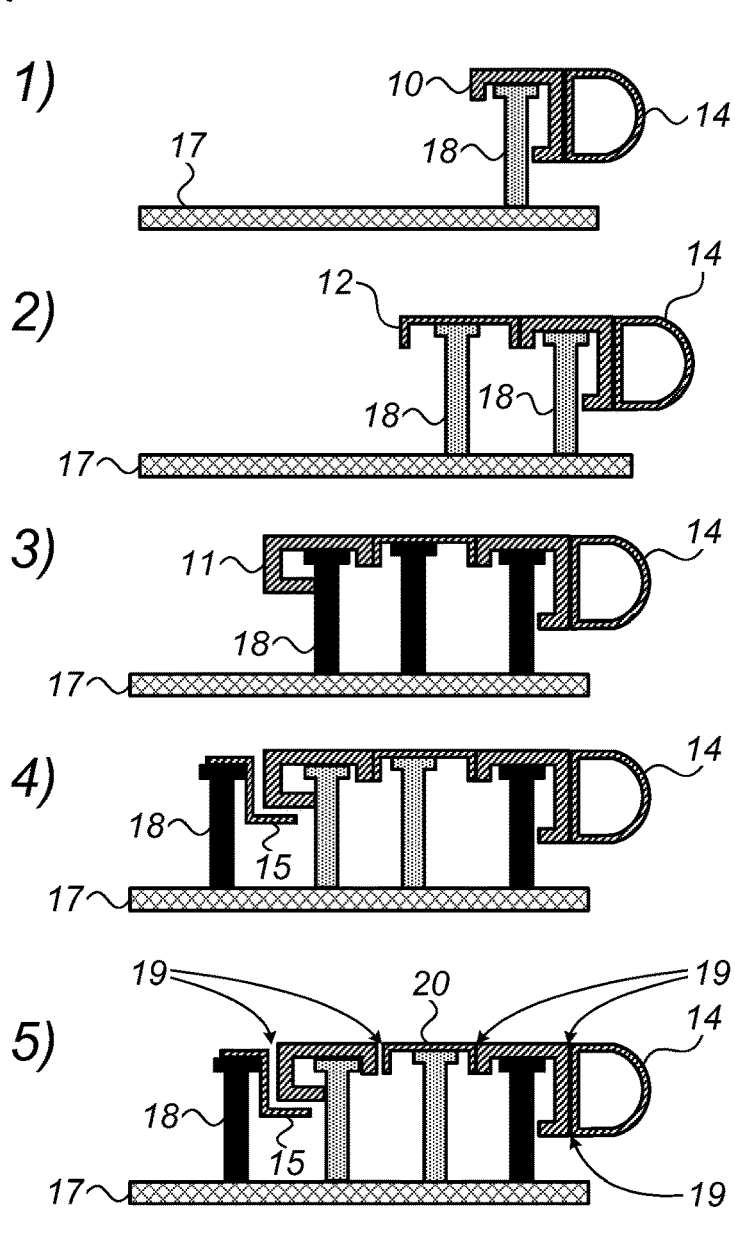
FIGS. 3A, 3C, 3D and 3E show schematically different steps of the assembly process according to the invention.
Figure 3B:
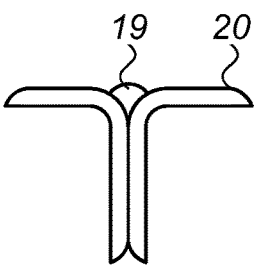
FIG. 3B shows schematically an enlargement illustrating a step of the process according to the invention.
Figure 3C:
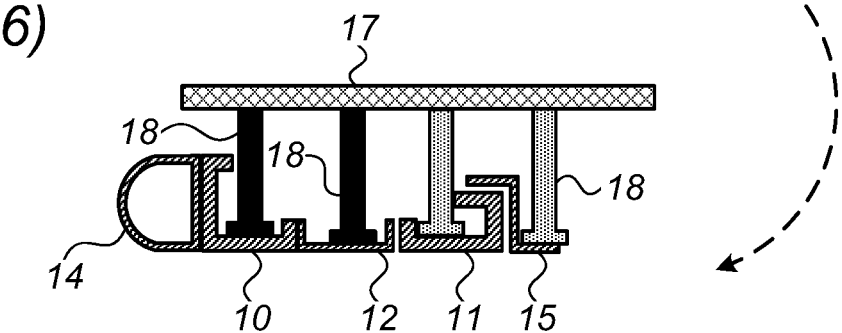
Figure 3D:
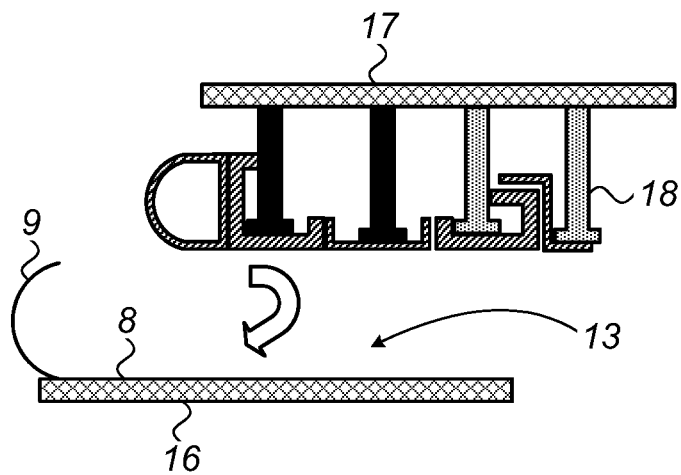
Figure 3E:
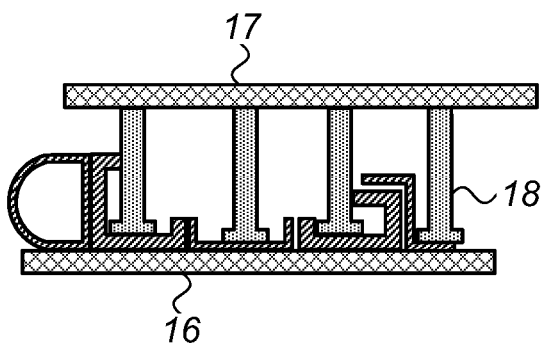

With reference to FIG. 3, the structural portions are represented which constitute the inner portion of the outer covering 8, from left to right: a front spar 10, a nose wing cap 14, a stringer 12, a rear spar 11 and a rear wing cap 15, they are placed on the inner surface 13 of the covering 8 which is conveniently placed on a receiving plane 16, whereas said structural portions will be placed side by side on an assembly plane 17 represented in section in FIG. 3B and subsequent ones.

The herein described process then comprises a step wherein the structural elements are placed side by side therebetween longitudinally, to determine a flat surface, having a plurality of longitudinal junctions, faced upwards.

This step is represented in FIGS. 3A, 3C, 3D and 3E in eight sub-steps, numbered consecutively.

In the first sub-step 1), the nose wing cap 14 and the front spar 10 are coupled therebetween and then they are positioned at a certain distance from the assembly plane 17 and in a certain position by means of a positioning pin 18: on their face faced upwards a first junction is formed determined by the approaching of the rounded edges of the two structural elements. A second junction is formed by the same approaching on the opposite side.

The stringer 12 is positioned in the second sub-step 2) so as to form with the front spar 10 a flat surface 20, by forming a third junction. Again, the positioning of the stringer 12 takes place by means of a suitable positioning pin 18 which is fastened to the assembly plane 17.

In the third sub-step 3) the rear spar 11 is added so as to extend the flat surface 20 together with the stringer 12 and the front spar 10, thus forming a fourth junction.

In the fourth sub-step 4) the rear wing cap 15 is added so as to extend the flat surface 20 together with the rear spar 11, the stringer 12 and the front spar 10, thus forming a fifth junction.

In these sub-steps, the above-mentioned structural elements were placed side by side longitudinally, by determining said flat surface 20, having a plurality of longitudinal junctions, and which is faced upwards.

In the fifth sub-step 5) the five longitudinal junctions, represented singularly in FIG. 3B, are filled-up by adhering thereto a corresponding filling tape 19, by making smooth the whole flat surface 20 and by preparing it to the coupling with the inner surface 13 of the outer covering 8.

In the sixth sub-step 6) (FIG. 3C) the assembly plane 17 is rotated by 180°, so as to have said flat surface 20 faced downwards and with all structural elements kept in their respective positions by the positioning pins 18.

Therefore, the structural elements are subjected to a translation and to a rotation of 180° in one single unit, by keeping them fixed in the mutual positions thereof and by transferring them above the inner surface 13 of a wing covering.

Subsequently, the structural elements are again translated in one single unit, by keeping them fixed in the mutual positions thereof, downwards, by making their flat surface 20 to coincide with said inner surface 13.

In this way, said flat surface 20 can be coupled to said inner surface 13; an additional partial rotation in the seventh sub-step 7) (FIG. 3D) allows to insert the nose wing cap 14 in the concavity 9 of the outer covering 8.

In the eighth and last sub-step 8) (FIG. 3E), both the nose wing cap 15 and the flat surface 20, with four junctions filled-up by a respective filling tape 19, coincide perfectly with the inner surface 13 of the outer covering 8—this semi-finished product then can be directed to subsequent processing.

It is to be noted that all five filling tapes 19 required in this case, but obviously this number can vary based upon the number of the structural elements and the related junctions, are placed in the same step, simultaneously or consecutively in one single unit, by acting on an exposed surface.

The symmetry of each tape 19 can be easily checked before it is overturned and made to adhere to the wing covering.

It is to be meant that at the end of this process, the positioning pins 18 are removed.

In order to implement, from a practical point of view, the above-described process, an apparatus is provided for implementing the above-described process, designated as a whole with 100, which will be described hereinafter with reference to FIG. 4 and to subsequent figures.

It comprises a frame 21 formed by double-T metal beams, having an inlet end 22 and an outlet end 23 closed by a respective gate 24, a longitudinal extension which defines an inner coupling compartment and two symmetrical processing areas at the respective sides, whereon respective assembly boards 25 are arranged which define an assembly plane 17, intended to receive wing structural elements placed side by side longitudinally therebetween, fastened to the assembly plane by means of positioning pins, so as to determine a flat surface faced upwards.

Each assembly board 25 is provided with means for translating the respective assembly plane 17 according to a direction perpendicular to the longitudinal extension of the structural elements, that is in direction of the frame 21 of the assembly apparatus 100, by keeping the assembly plane at a predetermined, and in case adjustable, height.

The frame 21 is crossed longitudinally by a transit lane, in case provided with rails, whereon a carriage 26 is made to slide which defines on the top thereof a mobile receiving plane 16 which can be loaded with a wing covering, intended to be coupled with wing structural elements.

The carriage 26 enters from the inlet end 22, it stops inside the frame 21 in a predetermined position with precision and, once the coupling has ended, it comes out from the outlet end 23.

The frame 21 on the top has a travelling crane 27 for moving loads. It supports a supporting element 28 having a beam-like elongated shape and which extends substantially from one end to the other end of the frame 21, it has on its own ends respective projections 29 (FIGS. 4 to 11 and 16 to 18).

Between said projections a handling board 30 is supported which then extends too from an end to the other one of the frame 21. On a surface of this handling board 30 a handling plane 31 is formed.

The travelling crane 27 acts on the supporting element 28 which can be raised or lowered or translated laterally. Therefore, the handling plane 31 is provided with means for translating said handling plane according to a direction perpendicular to the longitudinal extension of the structural elements 10, 11, 12 which are placed on the side assembly plane determined by the assembly board 25.

Furthermore, the handling plane 31 is further provided with means for translating vertically upwards or downwards said handling plane.

Figure 17:
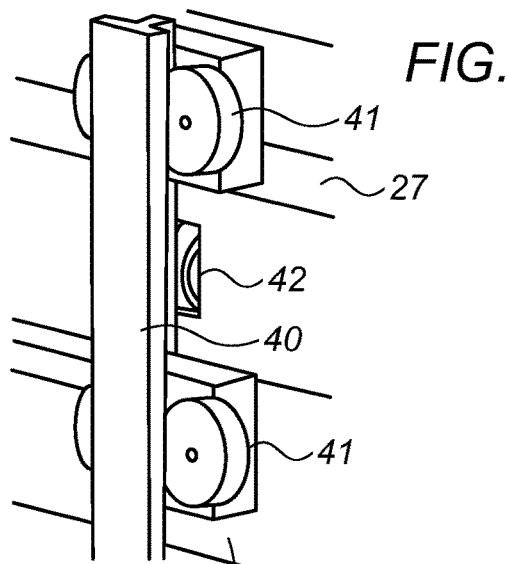

In details, the travelling crane 27 is assembled on side rails 40 and vertical rails, fastened to the frame 21, and it slides thereon thanks to two pairs of gears 42 on each side of the travelling crane 27 (FIG. 17). Conveniently the travelling crane 27 further comprises the driving means for lifting and lowering, which act on control wheels 42 arranged laterally to the travelling crane an engaged with a toothed rack, not visible in FIG. 17 as formed on the face of the side rails 40 faced to the travelling crane 27 itself.

Figure 18:
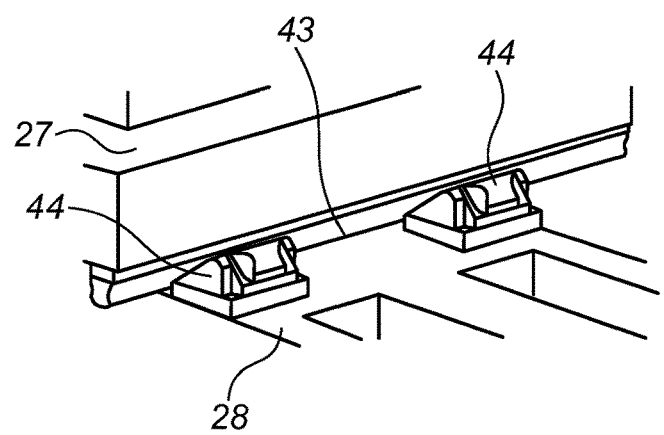

The travelling crane 27 further has, on its surface faced downwards, a pair of horizontal rails 43. Each horizontal rail 43 supports a pair of sliding shoes 44 fastened to the supporting element 28, which then can be translated laterally, by translating consequently even the underneath handling board 30 (FIG. 18).

Figure 13:
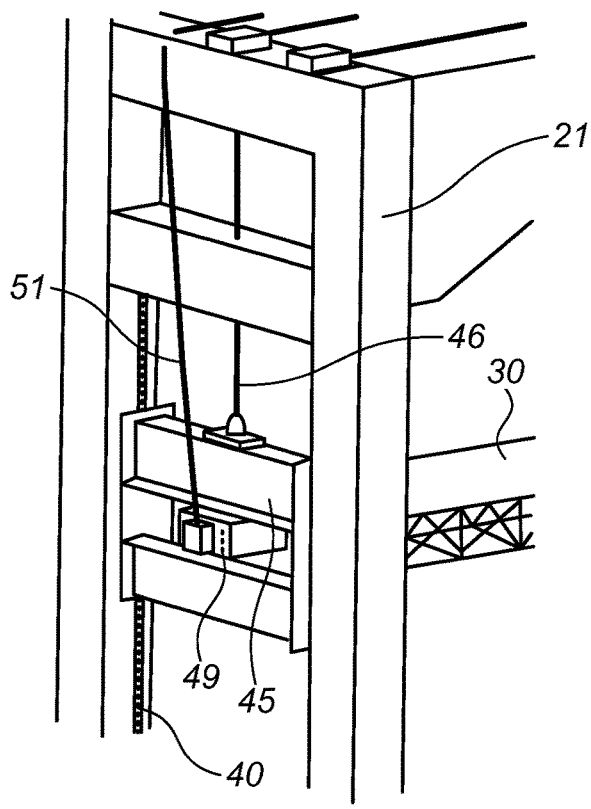
FIGS. 13, 14 and 15 show some details of the assembly apparatus of FIG. 4.
Figure 14:
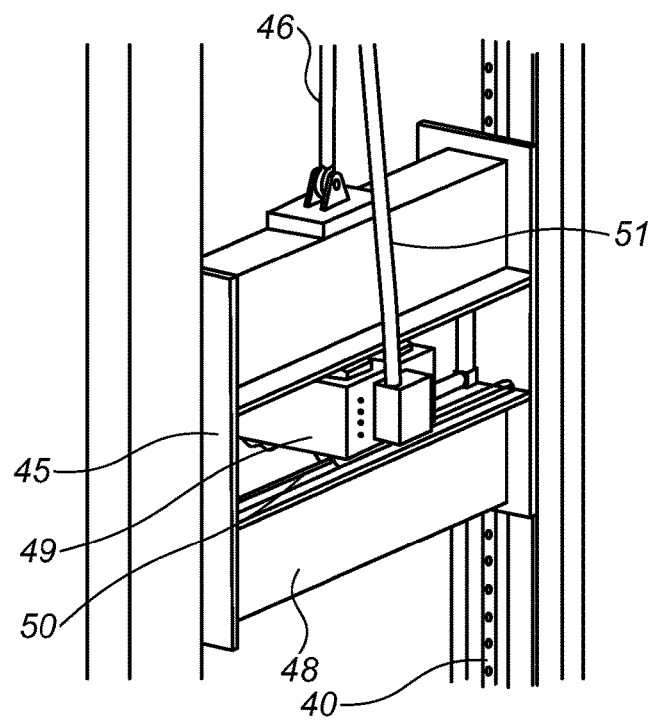
Figure 15:
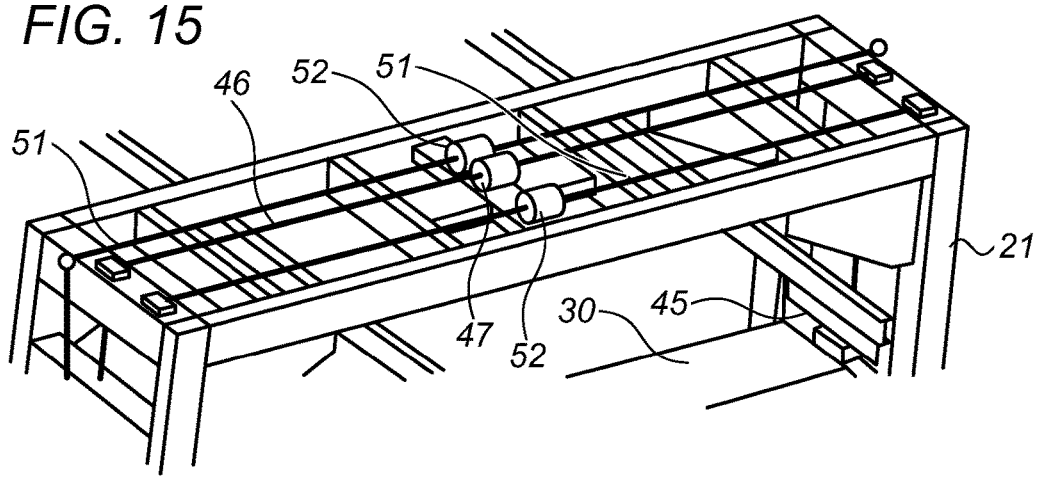

With reference to FIGS. 13 to 15 an alternative version of the apparatus 100 is illustrated, without travelling crane, wherein the frame 21 comprises, at its own ends 22, 23 respective supporting cursors 45, assembled on side tracks 40 formed on the frame 21. The handling board 30 extends from a supporting cursor 45 to the other one, thereto a respective first tie rod 46 is fastened, controlled by a first engine 47 which controls it in traction or release, by causing the simultaneous lifting or lowering of the two cursors 45 and then of the handling board 30 (FIGS. 13 and 15).

Each cursor 45 has a supporting beam 48 which supports a moving armature 49, placed on a pair of horizontal guides 50 formed on the upper surface of the supporting beam 48.

Each moving armature 50 is connected to the board 30 (FIG. 14): their simultaneous side shifting determines the translation of the handling board 30 horizontally and laterally.

Thanks to the capability of the handling plane 31 of being translated downwards, laterally, and upwards, it is possible to transfer the structural elements 10, 11, 12, assembled on the assembly plane with the modes described with reference to the FIGS. 3A to 3E, from the assembly plane to the handling plane 31.

With reference to FIG. 6, the assembly plane is translated upon approaching to the frame 21 and at the same time the handling plane 31 is lowered to the same level of the assembly plane and translated laterally in its direction, even if remaining inside the frame 21. When the two planes are aligned and placed side by side, it is possible to translate simultaneously the structural elements 10, 11, 12 assembled integrally from a plane to the other one, by implementing their fixing to the handling plane 31.

At this point (FIG. 7), the handling plane 31 is lifted, thus disengaging the assembly compartment, formed by the frame 21 whereon the handling plane 31 is assembled.

It is to be noted that the version of apparatus 100 represented in FIG. 6 is slightly different from the one of other figures, but it is functionally analogous.

According to another possible variant, the assembly board 25 could be hooked to the supporting element 28 and act, since then, as handling board. The passage of the same board from one of its fixed or mobile starting supports to the supporting element 28 constitutes the translation of the means associated to the two assembly and handling planes 31, implemented by the same board.

Once lifted the assembly plane 31, and then the assembly board 30, it is possible to insert in the frame 21, from the inlet end 22, the carriage 26 which defines said mobile plane, whereon a wing covering (skin) is received.

The correct positioning of the carriage 26 allows to implement an optimum positioning of the structural elements 10, 11, 12 assembled with respect to the mobile plane and to the wing covering of destination, which is inserted in the assembly compartment when the assembly plane 31 is raised upwards with respect thereto.

On this regard, it is to be noted that the carriage constitutes for said mobile plane means for moving said mobile plane according to a direction parallel to the longitudinal development of the wing casing placed on the on the mobile plane itself.

The assembly board 30 can be rotated with respect to bolts 32 arranged at the ends thereof. On this regard, the handling plane 31 has means for rotating said handling plane, and this rotation produces the overturning of the structural elements 10, 11, 12 fastened thereto in one single unit. The rotation can be driven according to any angle, depending upon the assembly needs.

Figure 4:
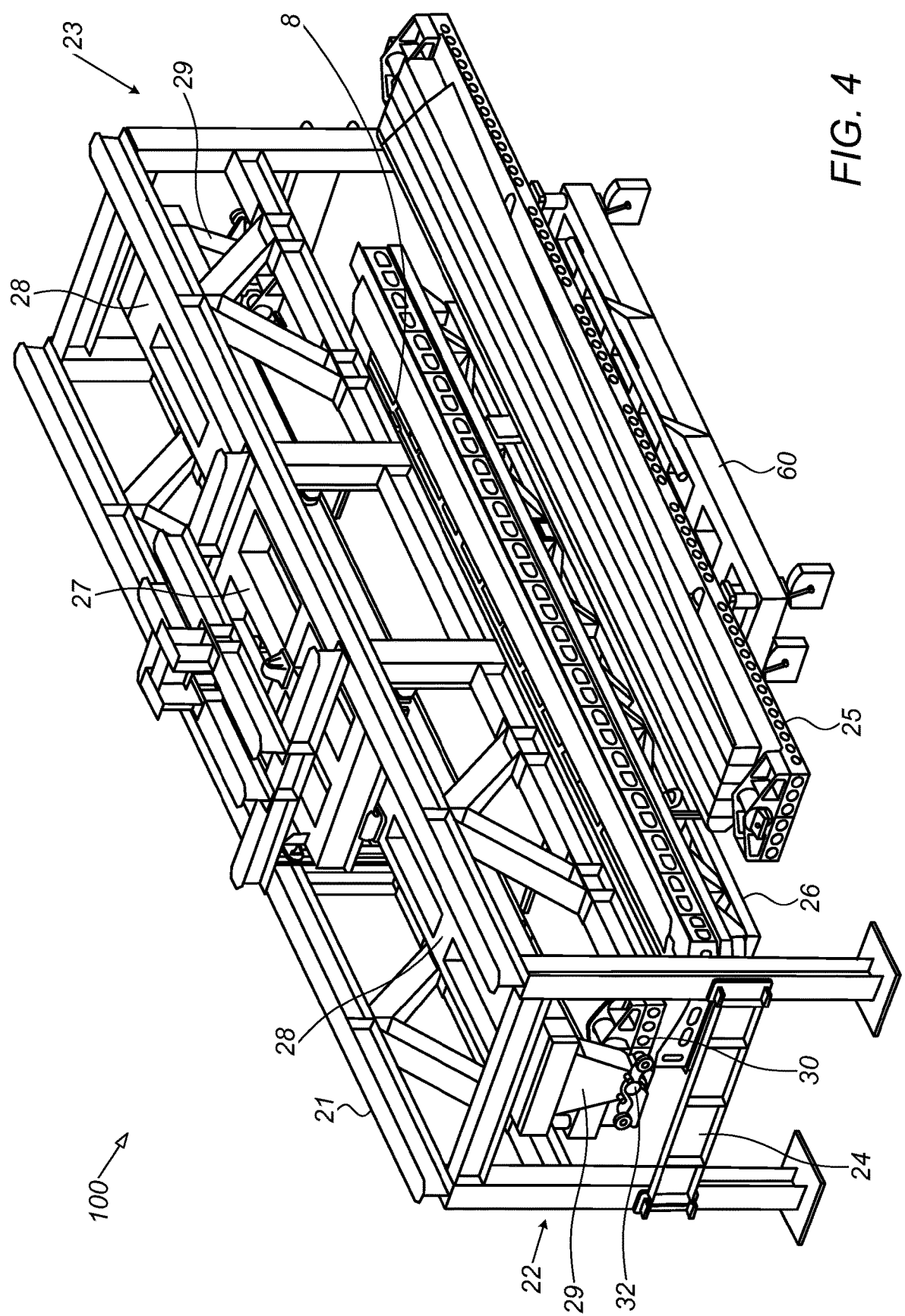
FIG. 4 shows an axonometric view from the top of an apparatus for assembling wing portions, that is for implementing the process according to the invention.
Figure 5:
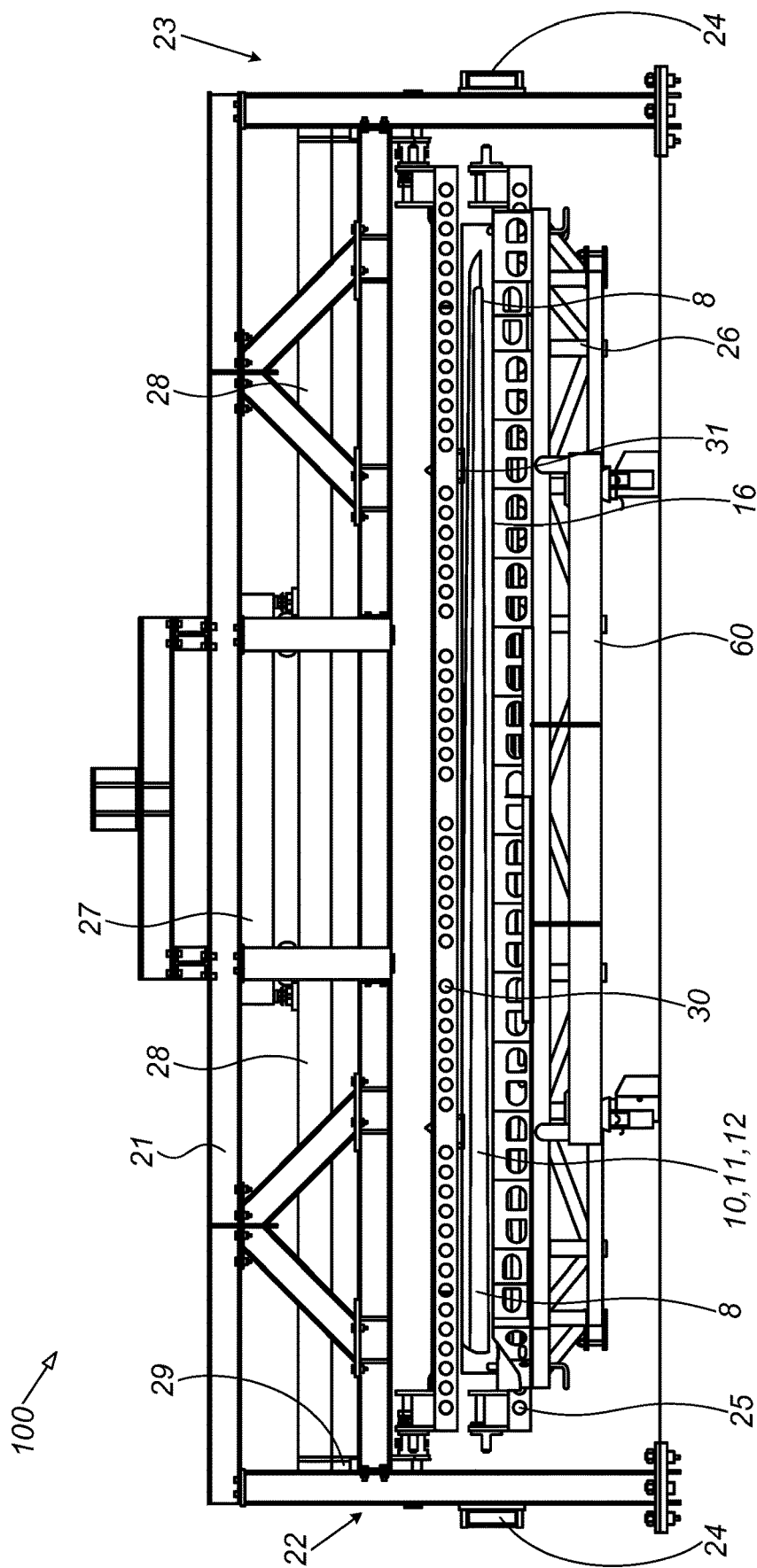
FIG. 5 shows a side view of the apparatus of FIG. 4.
Figure 16:
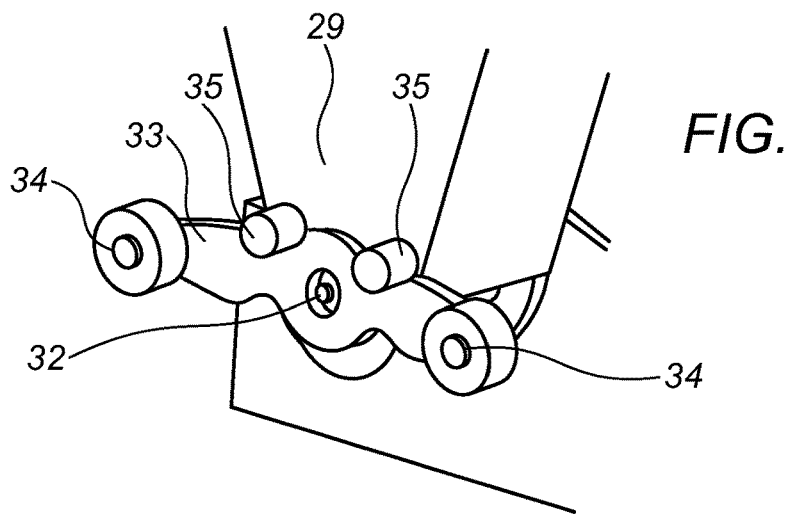
FIGS. 16, 17 and 18 show respective perspective views of further magnified details of the assembly apparatus as shown in FIGS. 1 and 11.

In the detail, and with reference to FIGS. 4, 5 and 16, to the bolts 32 handling arms 33 are connected, fixed to the handling board 30 by means of suitable handling pins 34. The projections 29 are provided with locking bolts 35 which keep locked the handling arms 33 in a pre-fixed position, with the handling plane 31 faced upwards or downwards. By retracting the locking bolts 35 it is possible to rotate the handling arms 33 and the handling board 30 by the wished rotation angle. The engine determining the rotation can be received in the same projections 29.

With reference to the variant of FIGS. 13 to 15, the not shown handling bolts of the board 30 are received in said moving armatures 50 and they are connected to respective second tie rods 51 controlled in traction or release by respective second engines 52, which control the rotation of the handling board 30.

Figure 8:
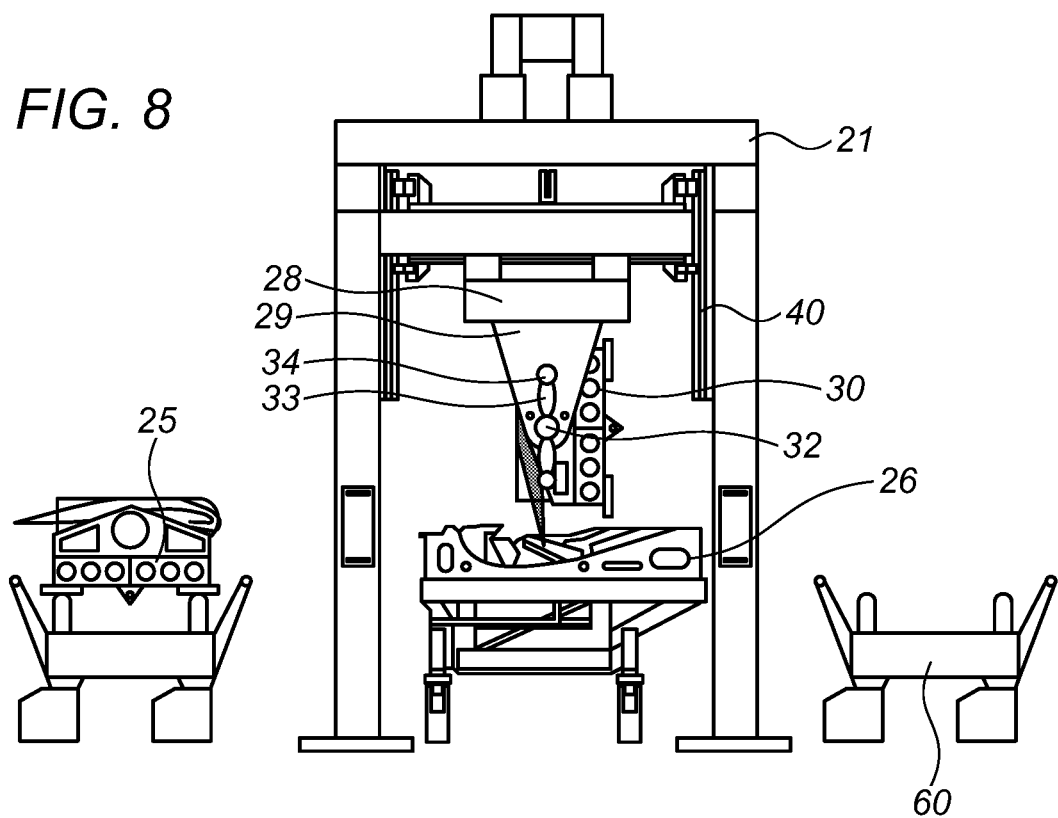
Figure 9:
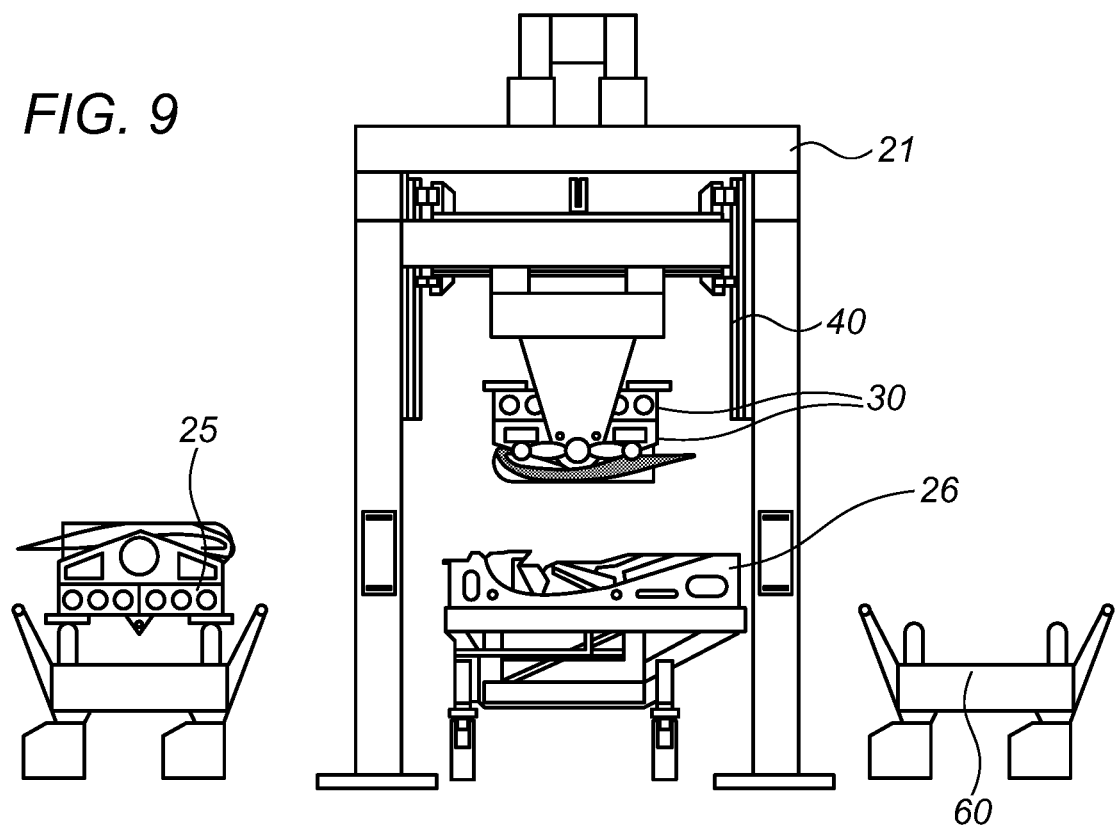
Figure 10:
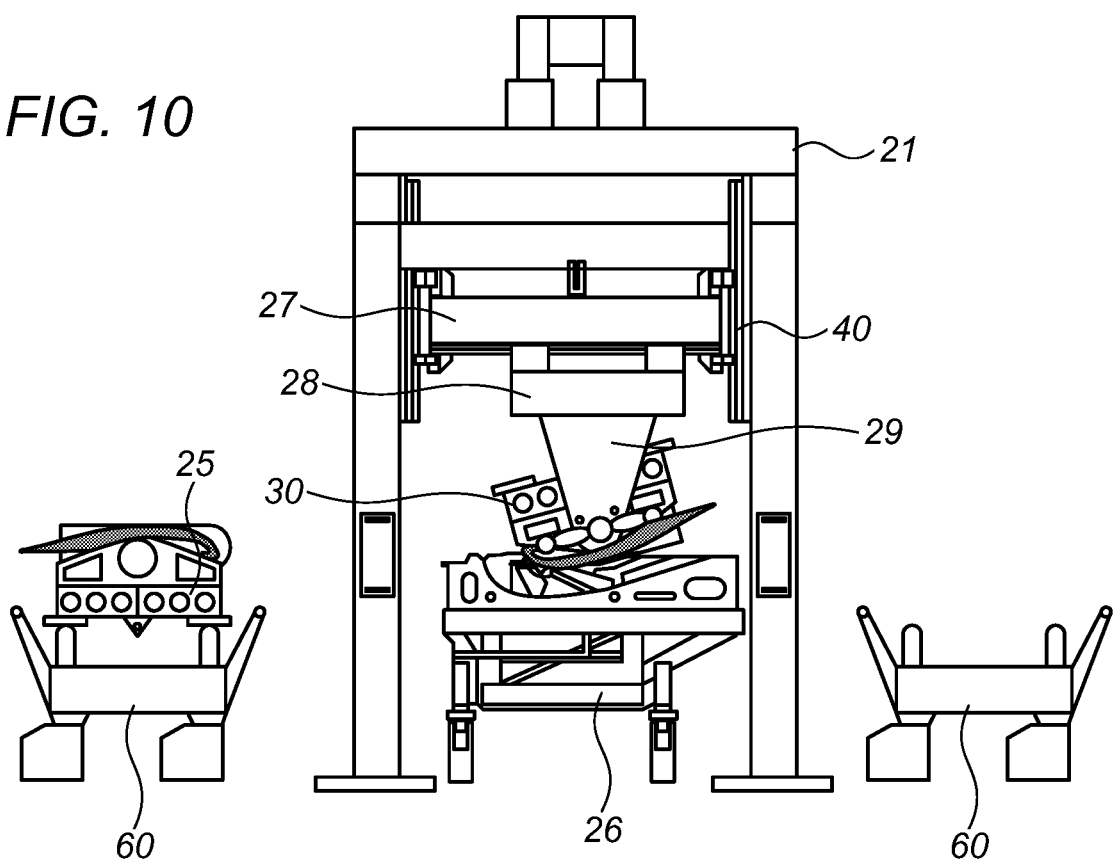
Figure 11:
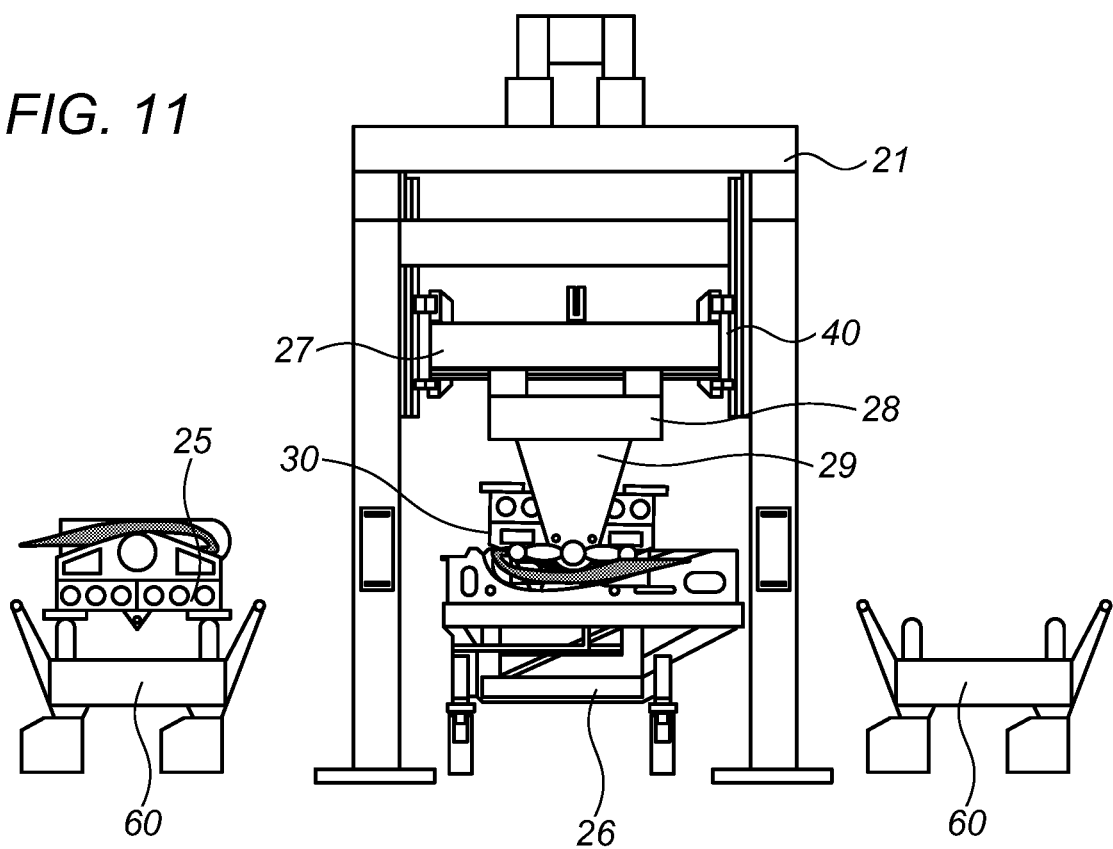

With reference to FIGS. 8 and 9, the structural elements 10, 11, 12 assembled on the handling plane 31 of the handling board 30 are arranged vertically at a wing covering on the carriage 26, and then they are rotated by 180°, so that the structural elements 10, 11, 12 are positioned above the wing covering.

Figure 12:
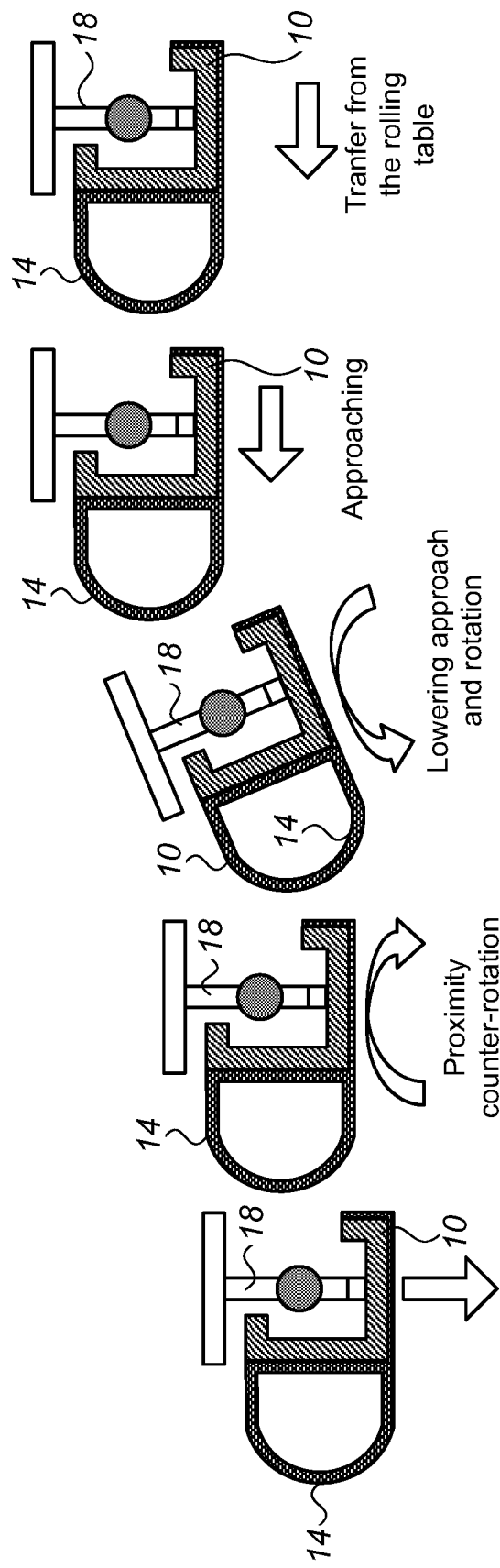
FIG. 12 shows in details the implementation of a particular step of the assembly process according to the present invention; [[and]]
Figure 12:
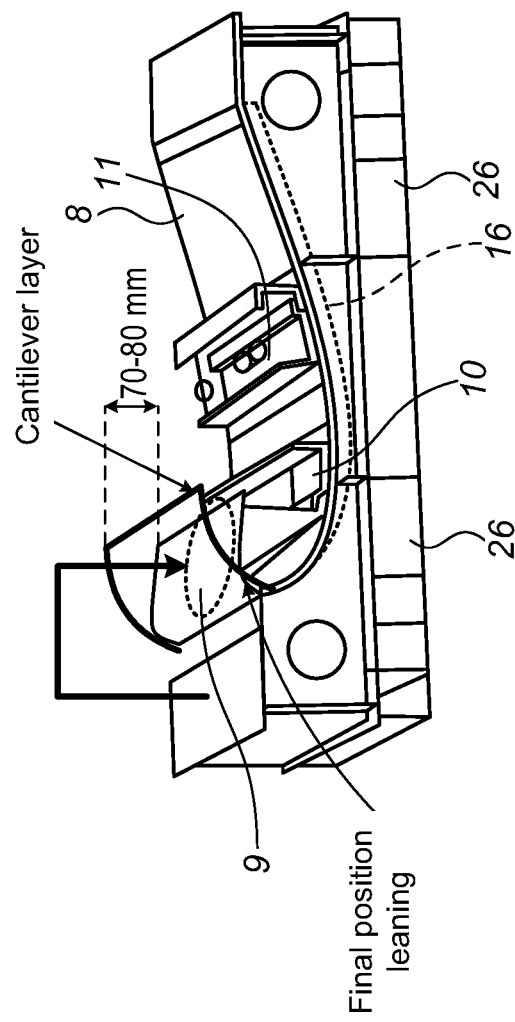

At this point, the handling plane 30 is lowered (FIG. 10) and rotated (FIGS. 10 and 12) to determine the insertion of the nose wing cap 4, assembled on the front spar 10, in the front concavity 9: the rotation will be gradual and it will accompany the progressive lowering of all structural elements 10, 11, 12 which thus are positioned simultaneously in the wing covering of destination.

At the end of this motion, the handling plane 30 is overturned and horizontal (FIG. 11): the positioning pins 18 can be disassembled so as to release the structural elements 10, 11, 12 in their position of destination.

At this point, the handling board 30 can be lifted and prepared to a new cycle, and the carriage 26 can be extracted from the frame 21 from the outlet end 23.

In order to accelerate the process, the apparatus 100 can comprise a pair of assembly boards 25, one on each one of its sides.

In this way, whereas an assembly between structural elements and wing covering is implemented, it is possible at the same time to assemble therebetween another set of structural elements on the assembly board 25 not engaged in that moment. In the end, the process then can start again on the other side of the frame 21.

To the above-described process and assembly apparatus a person skilled in the art, with the purpose of satisfying additional and contingent needs, could introduce several additional modifications and variants, all however within the protective scope of the present invention, as defined by the enclosed claims.

The invention claimed is:

1. A process for assembling portions of an aeronautical wing, wherein a wing covering (8) is assembled with carrier structural elements (10, 11, 12), comprises the steps of:
placing side by side the structural elements (10, 11, 12) longitudinally, to form the spars, by determining a flat surface (20), having a plurality of longitudinal junctions, faced upwards;
adhering to said longitudinal junctions respective filling tapes (19);
translating and rotating by 180° said structural elements (10, 11, 12) in one single unit, by keeping said structural elements (10, 11, 12) fixed in the mutual positions thereof and by transferring said structural elements (10, 11, 12) above an inner surface (13) of a wing covering (8); and
translating said structural elements (10, 11, 12) in one single unit, by keeping said structural elements (10, 11, 12) fixed in the mutual positions thereof, downwards, by making the flat surface thereof (20) to coincide with said inner surface (13).

2. The process according to claim 1, wherein the structural elements (10, 11, 12) are assembled together with a nose wing cap (14), adapted to engage a front concavity (9) of the wing covering (8).

3. The process according to claim 2, wherein the structural elements (10, 11, 12) are subjected to an additional partial rotation which allows to insert the wing nose cap (14) in the front concavity (9) of the outer covering (8).

4. The process according to claim 1, wherein the structural elements (10, 11, 12), during the assembly thereof, are fixed to an assembly plane (17) by positioning pins (18).

5. The process according to claim 1, wherein the structural elements (10, 11, 12) comprise at least one of: front (10) spars; rear (11) spars or stringers (12).

6. The process according to claim 1, wherein all longitudinal junctions are filled-up with corresponding filling tape (19) simultaneously or consecutively in one single unit.

7. An apparatus (100) for assembling portions of an aeronautical wing, wherein a wing covering (8) is assembled with carrier structural elements (10, 11, 12), comprising:
at least an assembly plane (17), adapted to receive the structural elements (10, 11, 12) placed side by side longitudinally therebetween, so as to determine a flat surface (20) faced upwards, which has means for translating said at least assembly plane (17) according to a direction perpendicular to the longitudinal extension of the structural elements (10, 11, 12);
a handling plane (31), adapted to receive said structural elements (10, 11, 12) placed side by side, comprising:
means for translating said handling plane (31) according to a direction perpendicular to the longitudinal extension of the structural elements (10, 11, 12), so that the structural elements (10, 11, 12) can be transferred simultaneously from an assembly plane (17) to the handling plane (31);
means for rotating said handling plane (31), adapted to overturn said structural elements (10, 11, 12) in one single unit;
means for translating vertically upwards or downwards said handling plane (31);
an assembly compartment, formed by a frame (21) thereon said handling plane (31) is assembled;
a mobile plane (16), adapted to receive a wing covering (8) and to be inserted in said assembly compartment when the assembly plane (31) is raised upwards with respect thereto, comprising means for moving said mobile plane (16) according to a direction parallel to the longitudinal development of the wing covering (8) on the mobile plane (16).

8. The apparatus (100) according to claim 7, wherein the frame (21) is crossed longitudinally by a transit lane whereon a carriage (26) is made to slide which defines a mobile receiving plane (16) on a top portion thereof.

9. The apparatus (100) according to claim 7, which on a top portion thereof has a travelling crane (27) which supports a supporting element (28) having a beam-like elongated shape, which extends substantially from a first end to a second end of the frame (21), and having on its own ends respective projections (29) therebetween a handling board (30) is supported, forming thereon, said handling plane (31).

10. The apparatus (100) according to claim 9, wherein the assembly board (30) comprises bolts (32) arranged at ends thereof to which handling arms (33) are connected, fixed to the handling board (30) by handling pins (34), locking bolts (35) being provided which keep the handling arms (33) locked in a pre-fixed position, with the handling plane (31) faced upwards or downwards.

11. The apparatus (100) according to claim 7, comprising, at the first and second ends (22, 23) of the frame (21), respective supporting cursors (45), assembled on side tracks (40) formed on the frame (21), a handling board (30) whereon said handling plane (31) is formed extending from a supporting cursor (45) to the other one.

\* \* \* \* \*